Jan. 8, 1924. 1,480,356
F. C. WEGENER ET AL
HANDLE FOR COOKING UTENSILS
Filed Jan. 25, 1923
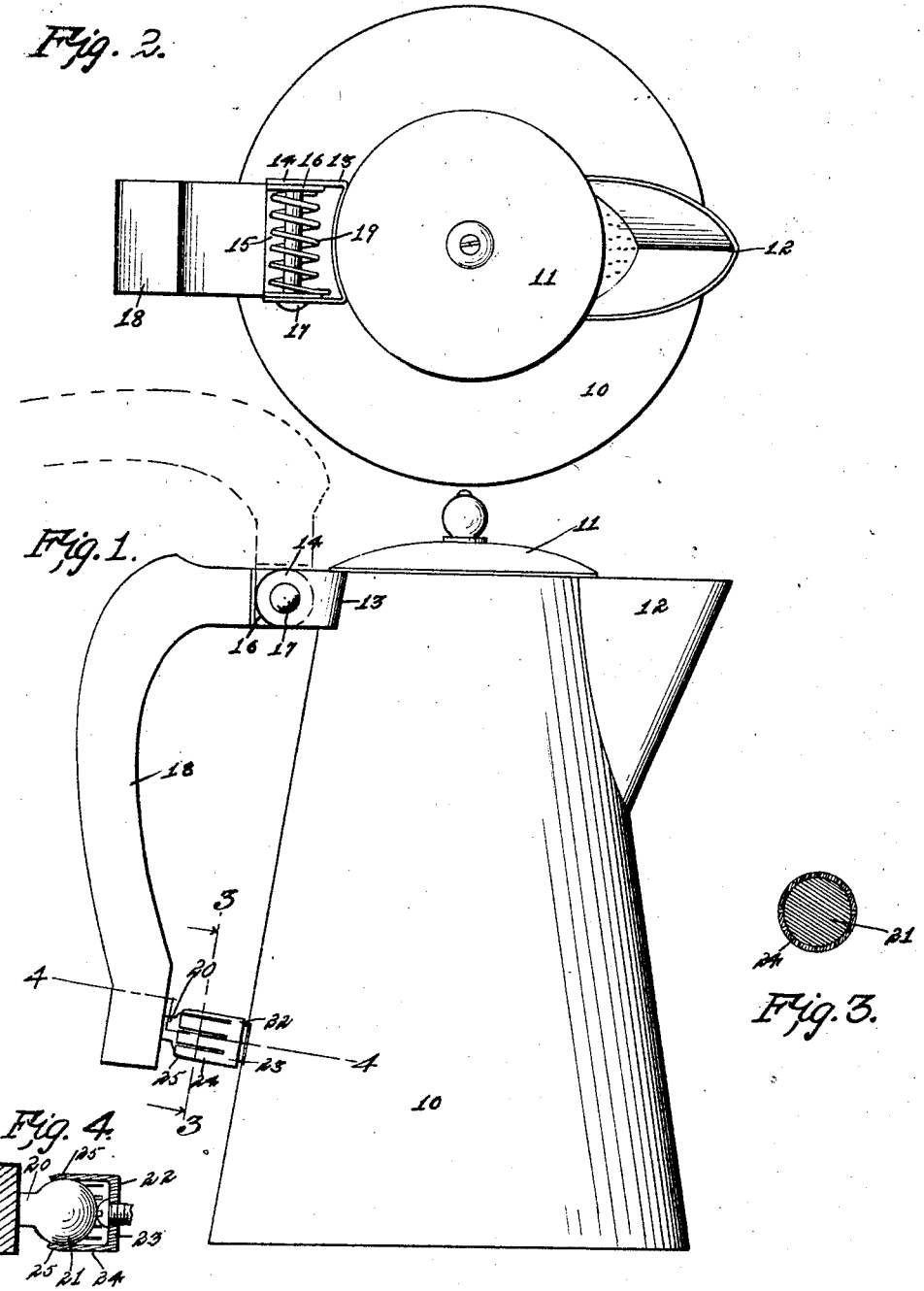
Inventors
Frank C. Wegener
John F. Larson
by Orwig & Hague Att'ys Patented Jan. 8, 1924.

1,480,356

UNITED STATES PATENT OFFICE.

FRANK C. WEGENER AND JOHN F. LARSON, OF DES MOINES, IOWA.

HANDLE FOR COOKING UTENSILS.

Application filed January 25, 1923. Serial No. 614,773.

*To all whom it may concern:*

Be it known that we, FRANK C. WEGENER and JOHN F. LARSON, citizens of the United States, and residents of Des Moines, in the county of Polk, State of Iowa, have invented a certain new and useful Handle for Cooking Utensils, of which the following is a specification.

The object of our invention is to provide a handle for coffee pots and the like of simple, durable and inexpensive construction which may be applied to the coffee pot in such a manner that it will automatically assume such a position that the heat or flames from the stove on which the coffee pot is being heated will not affect the handle to such an extent that it will be unbearable to the user, or burned off if made of wood.

More specifically it is the object of our invention to provide in connection with a coffee pot, a handle pivoted to the upper end of the coffee pot in such a manner that it will retain an elevated position while being heated, and provided with means whereby the handle may be moved to an operative position and latched in the said position by simply moving the handle to said position.

These and other objects will be apparent to those skilled in the art.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 is a side elevation of our improved handle for coffee pots and the like.

Figure 2 is a plan view of the same.

Figure 3 is a detail, sectional view taken on the line 3—3 of Figure 1.

Figure 4 is a detail, sectional view taken on the line 4—4 of Figure 1.

The numeral 10 indicates a coffee pot of the usual construction having a cover 11 and a pouring spout 12. At the upper end of the back side of the body portion 10 is a sheet metal strip 13 having outwardly extending ears 14, said ears being parallel to each other and spaced apart a considerable distance.

Pivotally mounted between the ears 14 is a sheet metal strap 15 having inwardly extending flanges 16 designed to rest adjacent to the inner faces of the ears 14, said flanges being pivotally secured in position by a pin 17.

The outer face of the strap 15 is secured to the upper and inner end of the handle 18, which is substantially of the ordinary shape and is made preferably of heat insulating material. A spring 19 is mounted on the pin 17 having one end resting adjacent to the outer face of the strap 13, while the other end is secured to one of the flanges 16, the spring being so wound on the pin that the handle 18 will be yieldingly and normally held in an elevated position, as shown in dotted lines. The lower end of the handle 18 is provided with an inwardly extending portion 20, the end of which is provided with a ball 21.

Secured to the back side of the coffee pot, adjacent to the inner end of the handle 20 when in its lowered position, is a socket member 22 designed to receive the ball 21. The said socket 22 consists of a single piece of sheet metal having a base member 23 and outwardly extending and yieldable side members 24, the ends of the side members being provided with inwardly curved portions 25.

The members 24 are for the purpose of latching the handle and preventing lateral movement of the members 20 and 21, when in a latched position. The base of the member 22 is secured to the coffee pot in a rigid manner, such as by a rivet.

By this arrangement it will be seen that if the handle 18 is in its normal elevated position, as shown in dotted lines, which is the position it will take when the coffee pot is on the stove, and the operator wishes to remove the coffee pot, he simply grasps the handle 18 and swings its free end downwardly until the member 21 engages the flanges 24. A further inward movement will cause the member 21 to be forced between said flanges, after which it will be retained due to the friction of the wedging action of the said members.

In this connection it will be seen that when the coffee pot is lifted from the stove by the handle 18, the handle will assume a closed position due to the fact that the center of gravity is to one side of the vertical center of the pin 17. The only time when the latch is necessary is when the coffee pot is being tilted to pour the coffee. When the pot is placed on the stove the member 21 is disengaged from the member 22 by simply swinging the lower end of the handle 18 outwardly and upwardly.

Thus it will be seen that we have provided a handle of simple, durable and inexpensive construction, which may be easily and quickly moved to an elevated position so that it will not become heated by the flames from the stove, the same being manipulated by the hand in which the coffee pot is carried.

In the drawings and specification we have illustrated and described our improved handle applied to a coffee pot, but it will be seen that the handle may be applied to other utensils without departing from the spirit of our invention.

By providing the ears 14 spaced apart with the flanges 16 pivotally secured between them, it will be seen that we have provided a pivot which is comparatively rigid against lateral swinging movement of the coffee pot relative to the handle member 18, while the handle member is in a latched position. The flanges 24 prevent the lower end of the handle from lateral movement.

We claim as our invention:

1. A cooking utensil provided with a handle having one end pivoted near the top of the utensil, means for yieldably holding the handle in an elevated position, a releasably connecting member for latching the lower end of the handle adjacent to the side of the cooking utensil.

2. A cooking utensil having near its upper end a pair of outwardly extending ears, a handle member having one of its ends pivotally mounted between the said ears, a spring for yieldably moving the free end of the handle member to an elevated position, and means for releasably connecting the lower end of the handle member adjacent to the outer face of the utensil near its lower end.

3. A cooking utensil having a pair of spaced ears near its upper end, a handle member having one of its ends provided with a pair of flanges positioned to rest adjacent to the said ears, and the other end provided with a ball shaped member, a pin extending through all of said flanges and ears to pivot the handle thereto, yieldable spring members secured to the outside of the utensil near its lower end for receiving the ball shaped member of said handle.

4. A cooking utensil, a handle member, means for pivotally mounting the handle member near the upper end of said utensil, means for yieldably holding the opposite end of the handle in an elevated position, and means for releasably receiving the free end of the handle adjacent to the outer face of the container, said means constructed to engage when the handle is swung to its operative position.

Des Moines, Iowa, January 13, 1923.

FRANK C. WEGENER.
JOHN F. LARSON.